United States Patent [19]

Reber

[11] 3,820,314

[45] June 28, 1974

[54] HAY-MAKING MACHINE

[76] Inventor: Walter Reber, 50 Avenue du Marecho Foch, Saverne (Bos-Rhin), France

[22] Filed: June 9, 1972

[21] Appl. No.: 261,328

[30] Foreign Application Priority Data
Aug. 3, 1971 France .......................... 71.29471
Nov. 23, 1971 France .......................... 71.43368

[52] U.S. Cl. .................................. 56/370, 56/377
[51] Int. Cl. ............................................ A01d 79/00
[58] Field of Search .............. 56/366, 370, 192, 377

[56] References Cited
UNITED STATES PATENTS

| | | | |
|---|---|---|---|
| 3,559,389 | 2/1971 | Van Der Lely et al. | 56/370 |
| 3,664,106 | 5/1972 | Maugg | 56/370 |
| 3,704,577 | 12/1972 | Reber | 56/370 |

FOREIGN PATENTS OR APPLICATIONS

| | | | |
|---|---|---|---|
| 1,189,224 | 4/1970 | Great Britain | 56/366 |
| 1,118,209 | 6/1968 | Great Britain | 56/370 |
| 456,225 | 7/1968 | Switzerland | 56/370 |

*Primary Examiner*—Robert Peshock
*Assistant Examiner*—J. N. Eskovitz
*Attorney, Agent, or Firm*—Young and Thompson

[57] ABSTRACT

The disclosure is of a hay-making machine for tedding or turning and windrowing or swathing, comprising at least two spinners or rotors upon which the working tools or tires occupy a position closer to a perpendicular position to the ground than to a position parallel with the ground, when they are close to the ground, at the front, for tedding, characterised in that for windrowing the working tools are transposed by means of their carrier arms into a position in which they are more inclined relative to the ground than in their position for tedding and are directed in the direction contrary to the direction of rotation of their respective spinners, and that, by this transposition, the trajectories described by the working tools are reduced.

8 Claims, 25 Drawing Figures

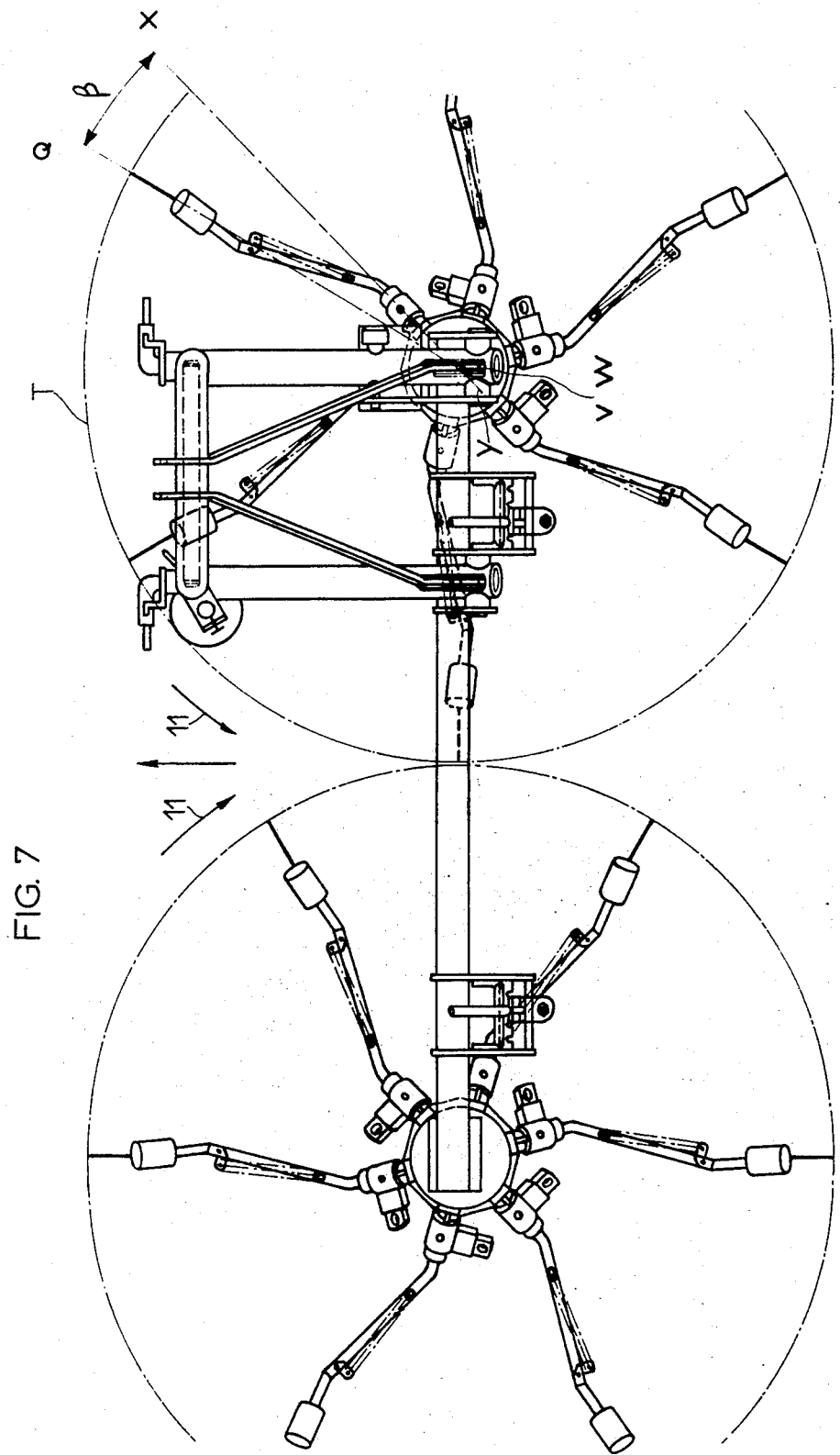

HAY-MAKING MACHINE

INTRODUCTION AND BACKGROUND OF THE INVENTION

The present invention concerns hay-making machines comprising at least two spinners provided with working tools such as forks, teeth or the like, that is, tines, which tools occupy a position closer to a perpendicular position to the ground than to a position parallel with the ground, at the front, when they are close to the ground for tedding or turning.

This kind of machine permits carrying out tedding work of excellent quality, contrary to other existing machines, but does not permit carrying out such satisfactory windrowing or swathing work, comparable for example with the windrowing work carried out by certain windrowers having fork-carrier arms operated by guide cams.

Admittedly devices exist which permit increasing the distance between axes of the spinners or rotors for windrowing, such for example as that described in French Pat. No. 1,491,376.

However it has proved that these devices are quite difficult to manoeuvre in view of the weight of the elements to be displaced, that they are no longer satisfactory when deformation occurs in the telescopic parts and that they do not always provide the desired rigidity of the spinner-carrying frame.

Furthermore in order to obtain truly satisfactory windrowing with the cited machines it would be necessary to add to such a device for the regulation of the interaxial distance means permitting transposing the working tools into a position inclined with respect to the ground and directed in the direction contrary to the direction of rotation of their respective spinners, which would involve a supplementary number of adjustments to be effected in the transformation of the tedder into a windrower and vice versa.

BRIEF SUMMARY OF THE INVENTION

The purpose of the present invention is especially to produce, at low cost, a multi-purpose hay-making machine which permits effecting both tedding work and windrowing work of excellent quality and does not possess the above-mentioned drawbacks and can be transformed from tedder to windrower and vice versa in a minimum number of operations. To achieve this result this invention proposes inter alia, non-limitative means which permit simultaneously transposing the working tools or tines from the said position for tedding mentioned in the introduction into a position for windrowing in which they are more inclined with respect to the ground and are directed in the direction contrary to the direction of rotation of their respective spinners or rotors, and diminishing the trajectory described by the working tools by this transposition.

In a preferred form of embodiment of the invention the working tools are carried by the extremities of carrier arms; the inner extremities of these arms being connected to the rotary member of the spinner by an articulation having a particular position permitting the achievement of the characteristics mentioned hereinbefore.

FURTHER DESCRIPTION AND ADVANTAGES OF THE INVENTION

According to one of the varients of embodiment in accordance with the invention, it is even possible simultaneously to transpose all the tools pertaining to one and the same spinner into the positions mentioned hereinbefore.

Further characteristics and advantages of the invention will appear from the following description and from the accompanying drawings which are given by way of non-limitative examples.

BRIEF DESCRIPTION OF THE VIEWS IN THE DRAWINGS

In the drawings:

FIG. 1 represents a partial profile view of a machine in a three-point linkage version with two spinners, in the tedding position, FIG. 2 represents a partial profile view of the machine according to FIG. 1 in the windrowing position, FIG. 3 represents a partial plan view of the machine according to FIG. 1 in which the trajectories described by the working tools overlap during tedding, FIG. 4 represents a partial plan view of the machine according to FIG. 2, FIG. 5 represents a section along the axis $x$–$y$ in FIG. 1 of the locking device of the tool carrier arm, FIG. 6 represents a section in the plane A—A in FIG. 5, FIG. 7 represents a partial plan view of a machine with two spinners in the tedding position, in which the trajectories described by the working tools do not overlap during tedding, FIG. 8 represents a plan view of the machine according to FIG. 7 in the windrowing position, FIG. 9 represents a profile view of a tool-carrier arm in the tedding position, FIG. 10 represents a plan view of FIG. 9, FIG. 11 represents a profile view of a tool-carrier arm in the windrowing position, FIG. 12 represents a front view of FIG. 11, FIG. 13 represents a plan view of the machine according to FIG. 2 when the tool-carrier arms are placed in the tedding position and when the tools are folded back, FIG. 14 represents a partial section of a spinner in side view, in a variant of the invention, FIG. 15 represents a diagrammatic profile view showing how an advantageous positioning of the carrier wheels can be determined, FIG. 16 represents, as a variant of the invention, a partial profile view of a machine with two spinners in the tedding position, FIG. 17 represents a partial plan view of the machine according to FIG. 16, in which the trajectories described by the working tools overlap during tedding, FIG. 18 represents a partial profile view of the machine according to FIG. 16 in the windrowing position, FIG. 19 represents a partial plan view of the machine according to FIG. 18, FIG. 20 represents as a variant of the invention a partial profile of a machine with two spinners in the tedding position, FIG. 21 represents a partial plan view of the machine according to FIG. 20 in which the trajectories described by the working tools do not overlap during tedding, FIG. 22 represents a partial profile view of the machine according to FIG. 20 in the windrowing position, FIG. 23 represents a plan view of the machine according to FIG. 22, FIG. 24 represents as a variant of the invention a machine in partial profile view, FIG. 25 represents a profile view of a machine in the tedding position, provided with special folder guide elements.

DETAILED DESCRIPTION OF THE PREFERRED EMBODIMENTS

Figure 1:
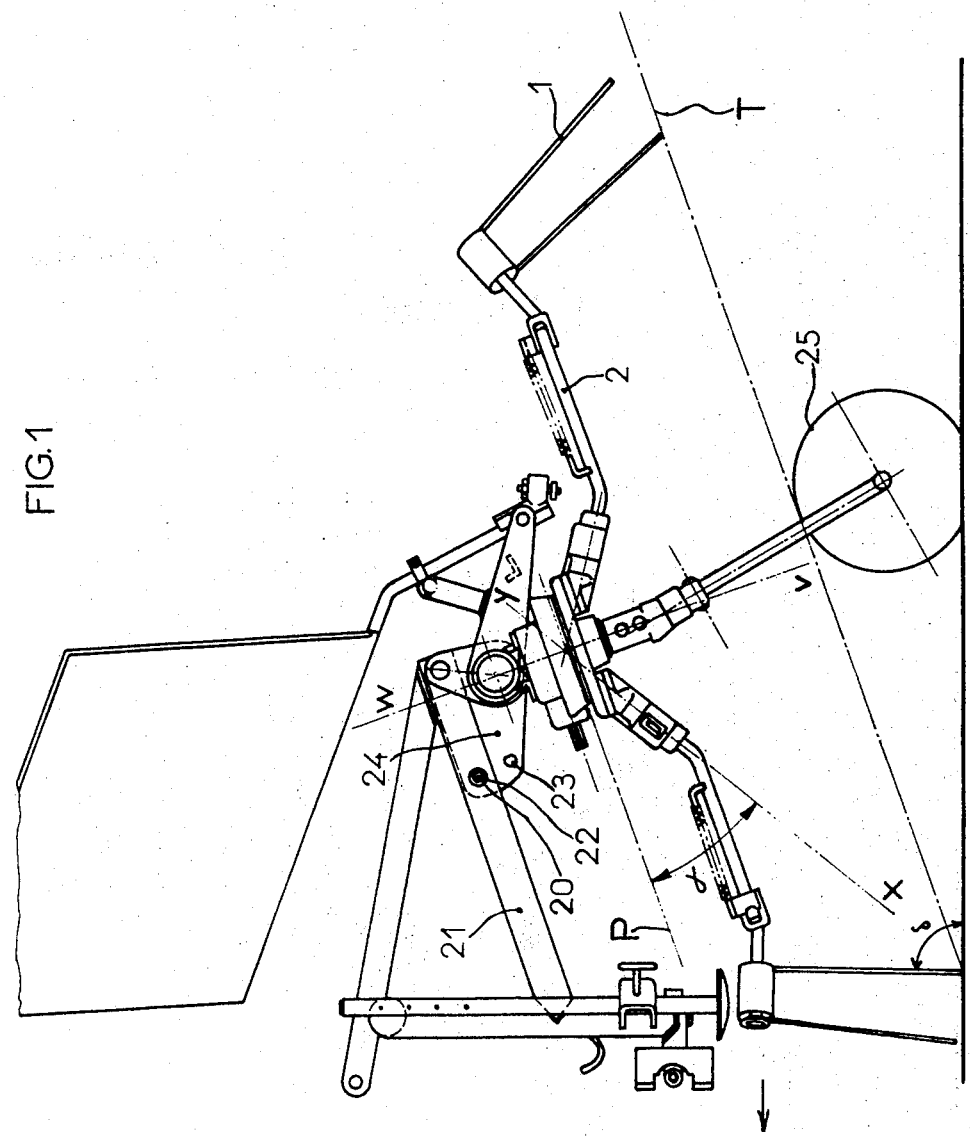
Figure 2:
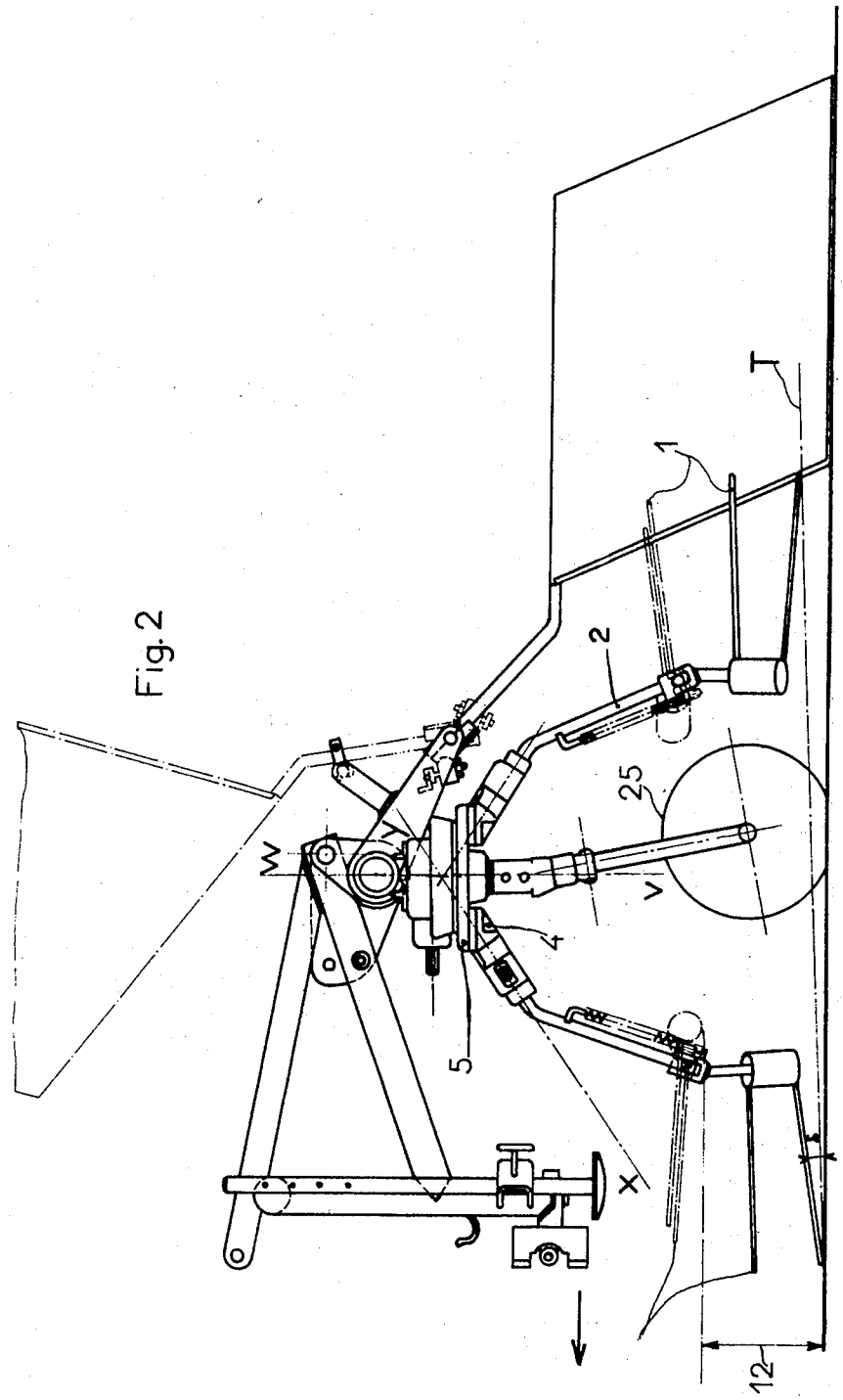
Figure 3:
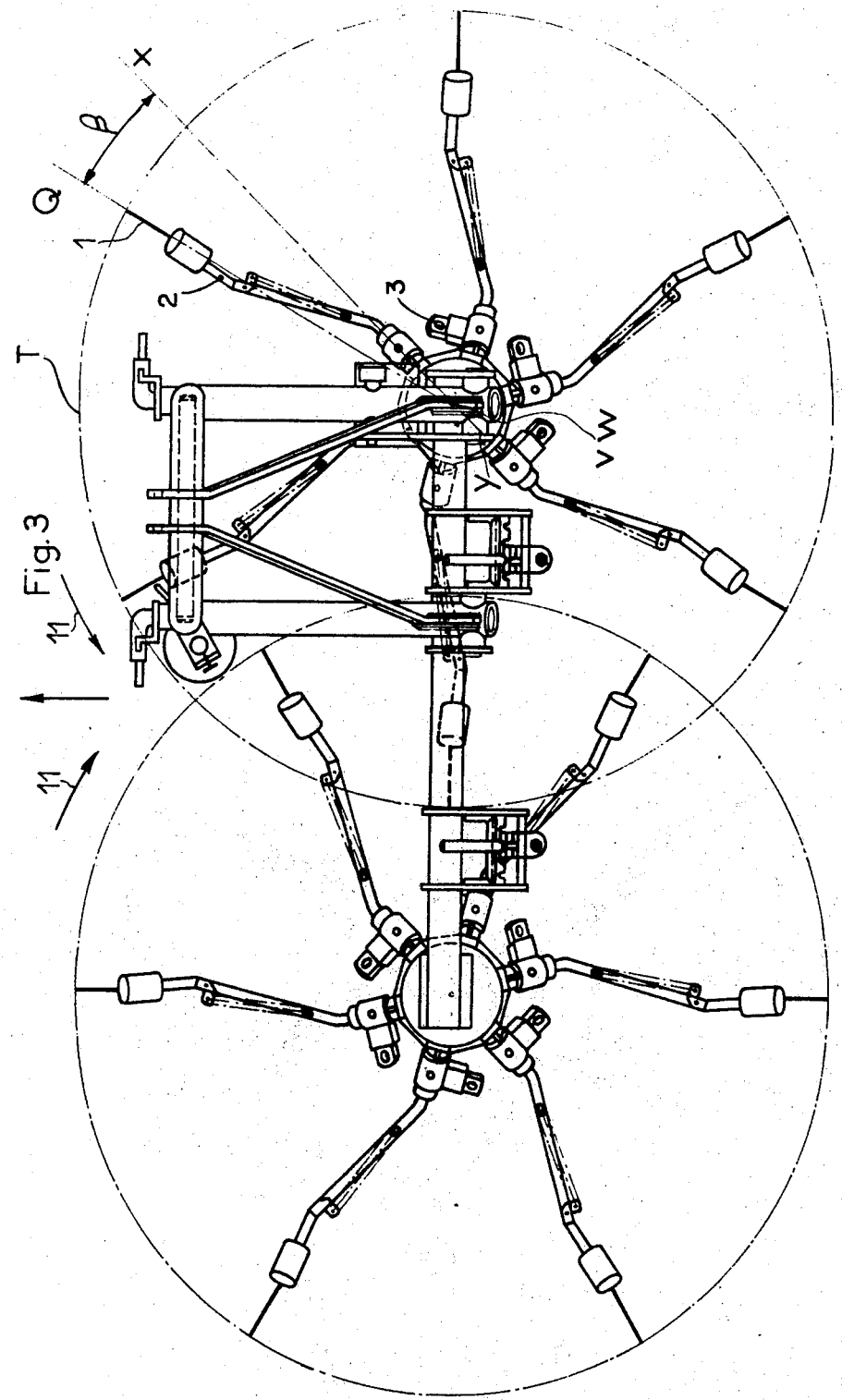
Figure 4:
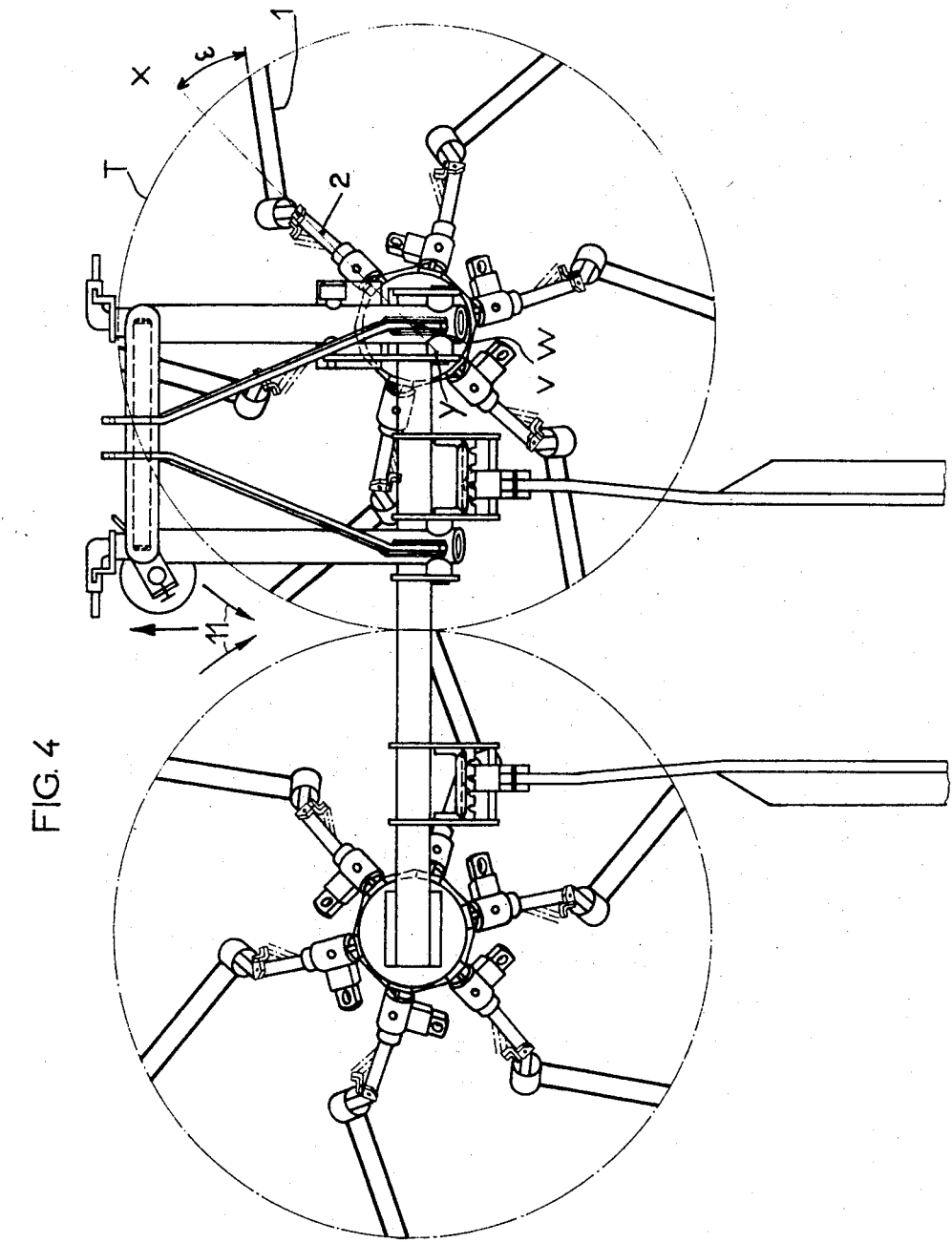

In a first example of embodiment according to the invention, the tools or tines 1 can be transposed from the tedding position as represented in FIGS. 1 and 3 into the windrowing position as represented in FIGS. 2 and 4 in the manner as described below.

Each tool-carrier arm 2 can pivot about an axis $x-y$ and can be locked in rotation in at least two positions in relation to the said axis $x-y$ which forms:

an angle $\alpha$ which can be between 20° and 40° but is preferably between 29° and 33° with a plane P perpendicular to the axis of rotation $v-w$ of the spinner, and an angle $\beta$ which can be between 8° and 20° but is preferably between 13° and 17° with the plane Q containing the rotation axis $v-w$ and passing through the tool of the tool-carrier arm concerned when the said tool is in the tedding position.

Thus the fact that it is possible to pivot the tool-carrier arms 2 about particular axes $x-y$ and the fact that it is possible to lock these arms in rotation in at least two appropriate positions simultaneously permit:

transposing the tools 1 from a position substantially perpendicular to the ground at the front into a position substantially parallel to the ground and directed in a direction contrary to the direction of the rotation of the spinner or rotor and reducing the trajectories described by the tools by the said transposition.

According to the intensity of the rotation around the appertaining axes ($x-y$), the tools may be more or less inclined in relation to the ground (angle $\delta$) and directed more or less in the direction contrary to the direction of rotation of their respective spinners (angle $\epsilon$).

The fact of having, for windrowing, tools substantially inclined in relation to the ground and directed substantially in the direction contrary to the direction of rotation of their respective spinners permits a good formation of windrow while allowing the tools not to attack the fodder too roughly and to disengage well from the windrow when the latter is formed.

Figure 6:
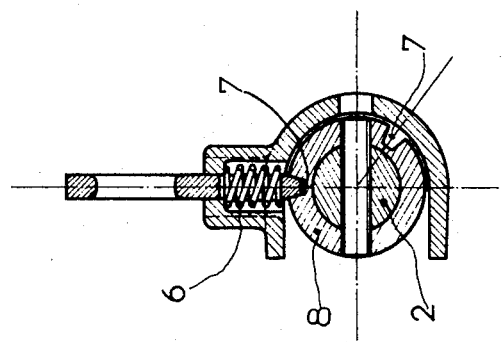
Figure 5:
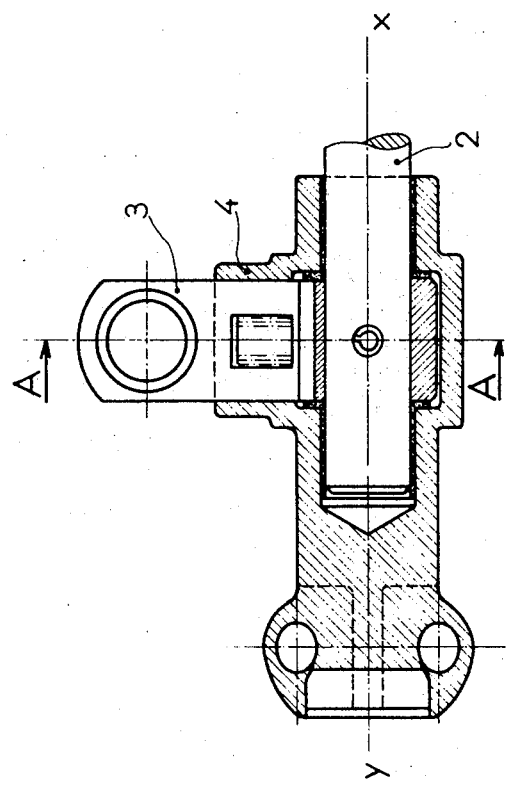

As indicated by FIGS. 5 and 6, the locking in rotation of each arm 2 in relation to the axis $x-y$ can be effected by means of a bolt 3 guided in a support 4 made fast with the rotating hub 5, which bolt is pressed by a compression spring 6 into a groove 7 of a bush 8 fast with the arm 2.

In order to release the rotation-fastening of an arm 2 and its support 4, for the purpose of pivoting the said arm 2 about its axis $x-y$, it is sufficient to exert a pull upon the bolt 3.

The position of the grooves 7 and the number thereof represented in FIG. 6 are not limiting.

In this first example of embodiment as represented in FIGS. 1 to 4, the trajectories T described by the tools 1 overlap during tedding (FIG. 3) and are substantially tangential during windrowing (FIG. 4).

Figure 8:
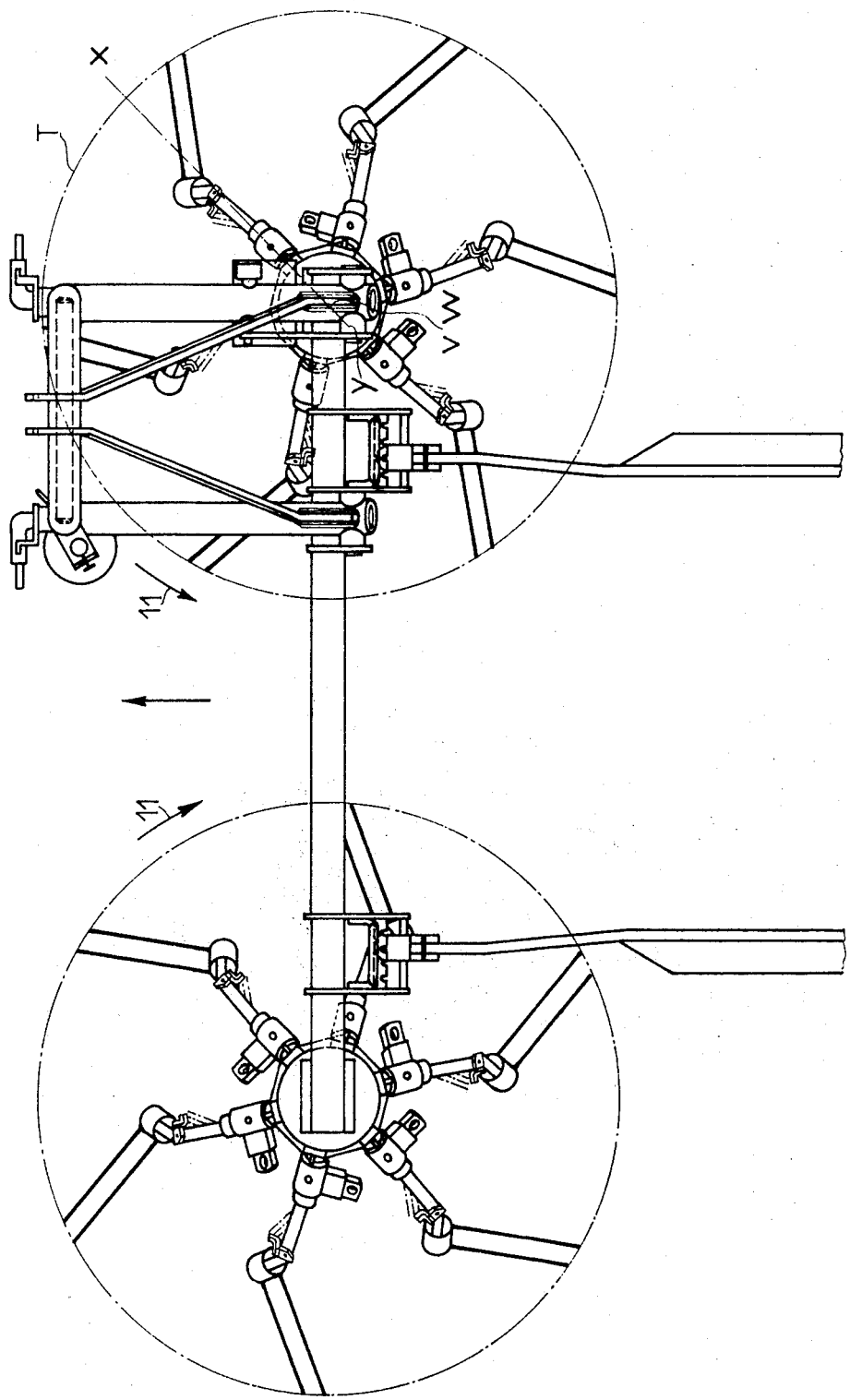

In the example of embodiment as represented in FIGS. 7 and 8, the trajectories T described by the tools 1 are tangential or even slightly spaced from one another during tedding.

One spinner can be advanced in relation to the other without departing from the scope of the invention. Likewise the directions of rotation of the spinners and their rotation speeds may possibly be variable.

Another characteristic of the invention consists in an articulation 9 and an electric connection 10 on each transposable arm 2. Thus during windrowing (FIGS. 11, 12) the tools can be retracted upwards in the direction contrary to the direction of rotation 11 of their respective spinners. This permits them to follow variations of level of the ground and to treat dry fodder with great care and thus to limit the losses by defoliation. Moreover in the case of encountering an obstacle the tools can be retracted upwards into the position represented in chain lines in FIG. 2. This permits of greatly reducing the risk of deformation of the carrier arms 2. For transport all tools can be folded back into the position represented in chain lines in FIG. 2, for the purpose of increasing the ground clearance 12; this is of particular interest in the case of towed machines.

Figure 9:
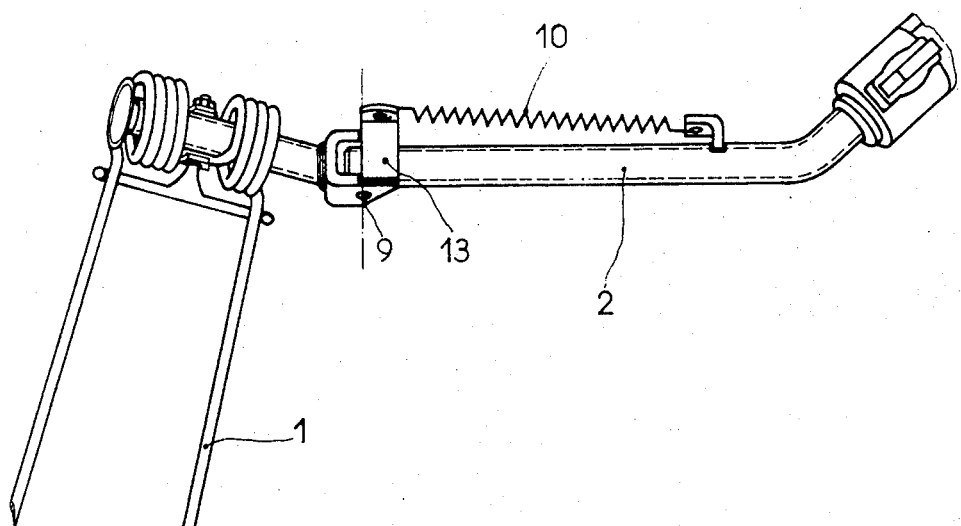
Figure 10:
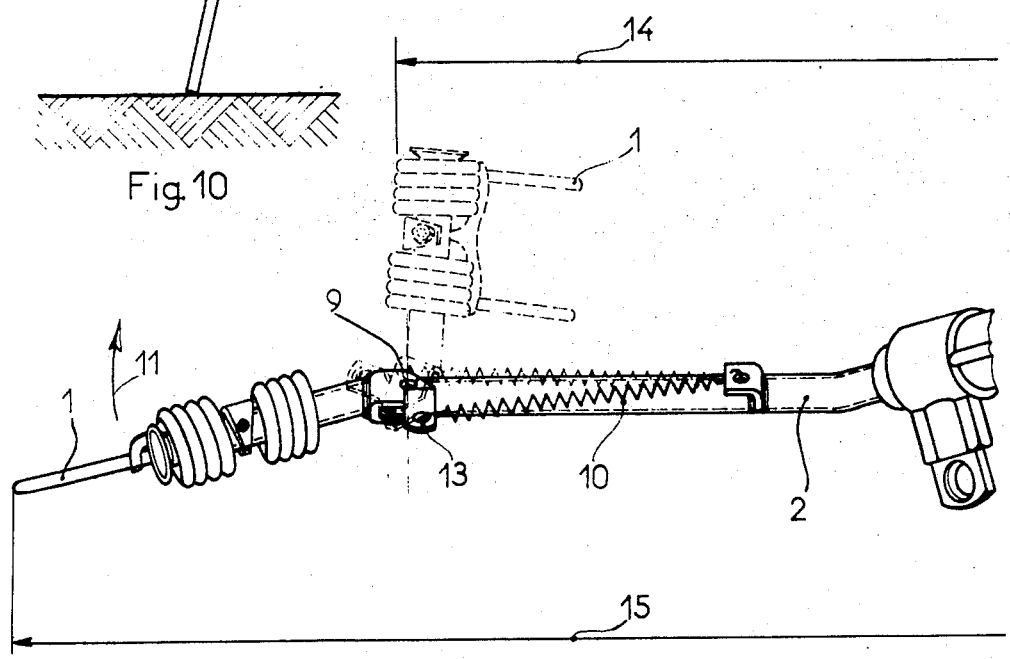
Figure 13:
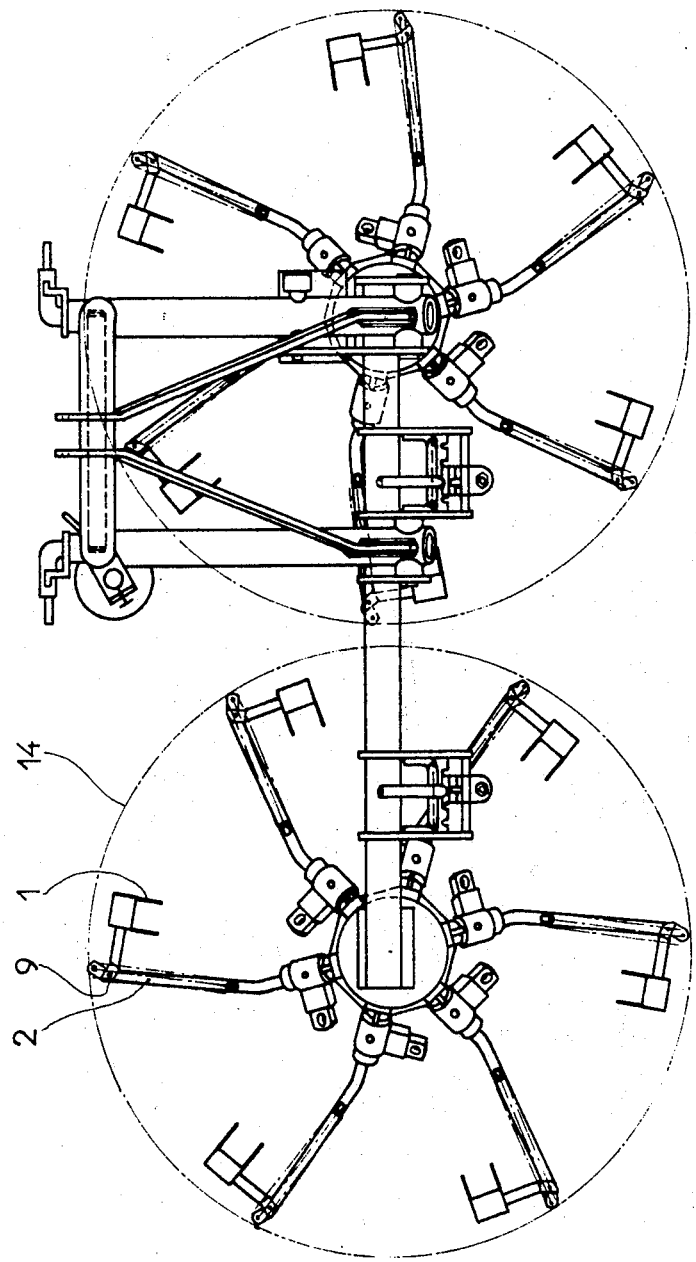

From FIGS. 9 and 10 it appears that the stop 13 does not permit the tools 1 to fold back about the articulation 9 in the direction contrary to the direction of rotation 11 of their respective spinners during tedding. Thus the tools will have only their own inherent elasticity in order to retract in the direction contrary to the rotation direction 11 of their respective spinners during tedding. This feature will enable them effectively to ted the fodder, which is generally moist during this working phase. As the ends of the arms 2 are quite distant from the ground during tedding, the risk of deformation of the said arms is quite slight. When the spinners are stationary the tools can however be folded back, but in the tedding rotation direction 11 of their respective spinners, as represented in chain lines in FIG. 10 and in solid lines in FIG. 13. By this folding back the overall diameter 14 of the spinners becomes less than their initial overall diameter 15. In certain cases this permits of having machines with a quite great working width while having an acceptable transport width.

When the spinners are driven in rotation for tedding, the tools 1 are brought into the working position under the action of centrifugal force.

Figure 11:
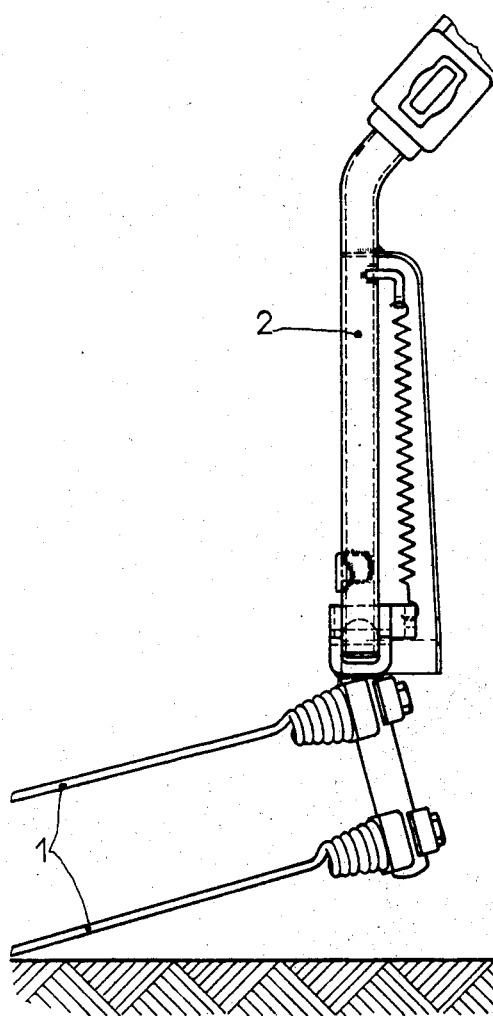
Figure 12:
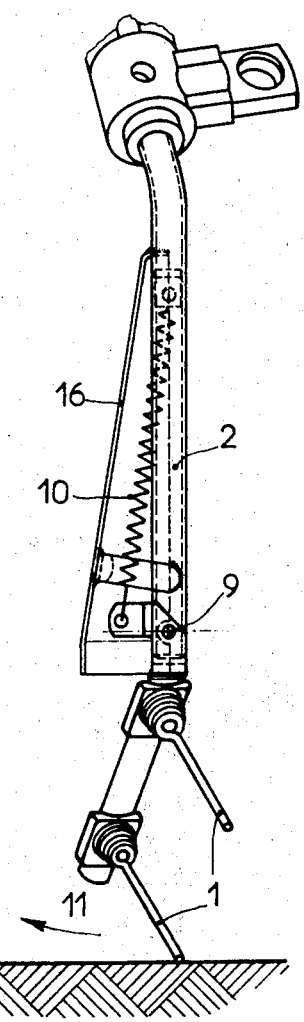

The teeth as represented in FIGS. 11 and 12 have the advantage that they can be retracted in all directions without thereby being prematurely deformed. The same would be the case for teeth mounted on an elastic body such as rubber.

In order to avoid entanglement of fodder around the springs 10, protectors 16 can be provided on the carrier arms 2. These springs 10 could also be mounted partially inside the arms 2.

Figure 14:
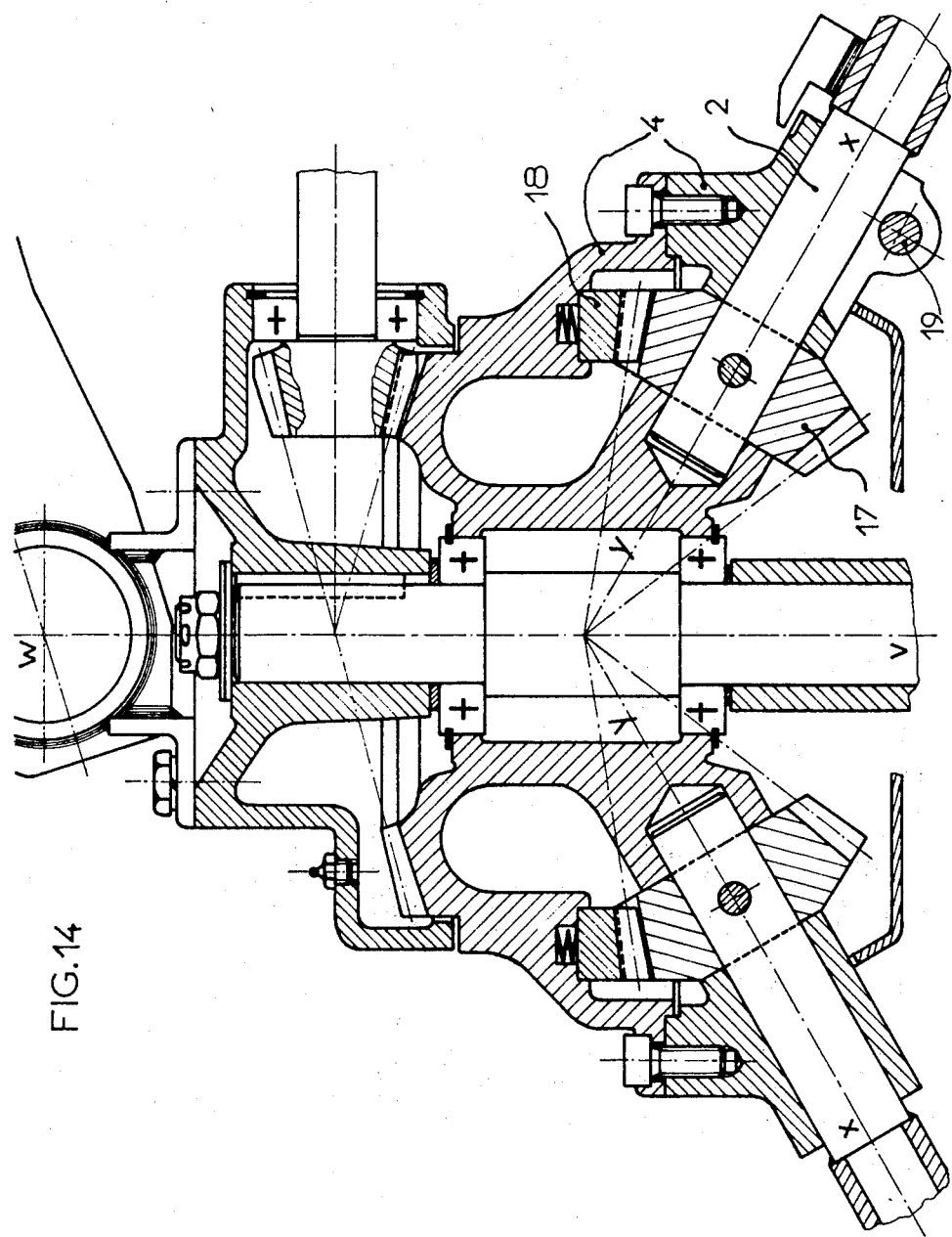

In the variant of embodiment as represented in FIG. 14 all the arms 2 are lodged directly in the direction of the described characteristic axes $x-y$ in the rotating hub 4 and mesh - by means of a bevel pinion 17 made fast with them - with a toothed rim 18 rotating with the hub 4 during working but capable when stationary of being displaced in rotation about the axis v–w of the spinner in relation to the hub 4.

Thus in order to pivot all the arms 2 simultaneously about their respective characteristic axes x–y, it is sufficient to displace the toothed rim 18 in rotation in relation to the hub 4 and to lock it in rotation in relation to this hub in the angular positions corresponding to the desired positions of the tools. This rotational displacement of the rim 18 and this locking thereof can be obtained by displacement about the characteristic axis x–y of one single arm 2 and by gripping of the said arm 2 in relation to the hub 4 with the aid of the gripper screw 19. Without departing from the scope of this invention, the inclination of the axes of rotation of the spinners and the manners of inclination thereof can vary.

For tedding, the axes of rotation v–w of the spinners are preferably substantially inclined forwards, while for windrowing these axes of rotation are preferably only very slightly inclined forward.

The adjustment of these inclinations can be effected for example with the aid of the third point rod of the driving tractor or a regulating device 20, 22, 23 provided on the machine or with the aid of the columns of the carrier wheels 25.

Figure 15:
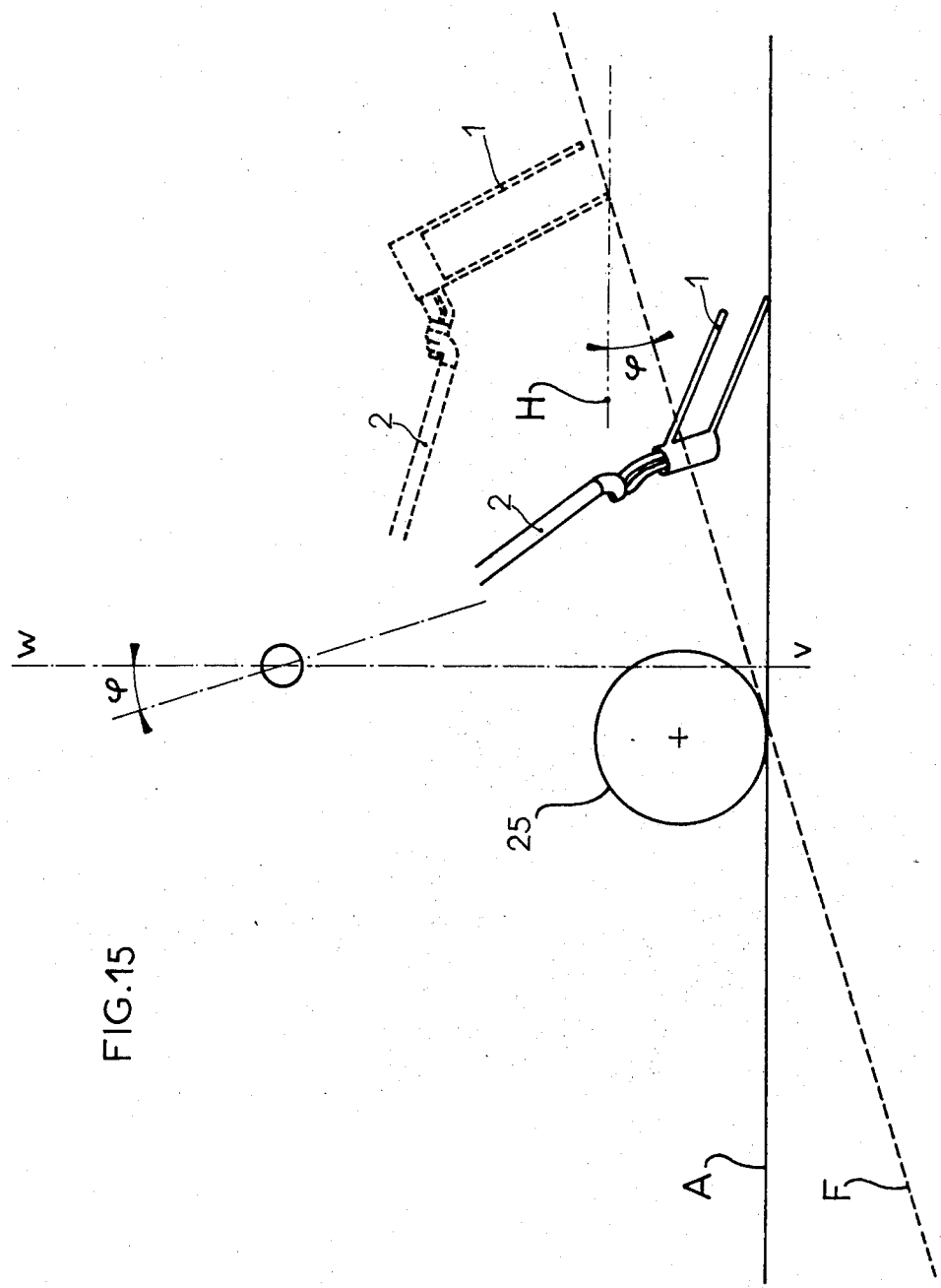
Figure 16:
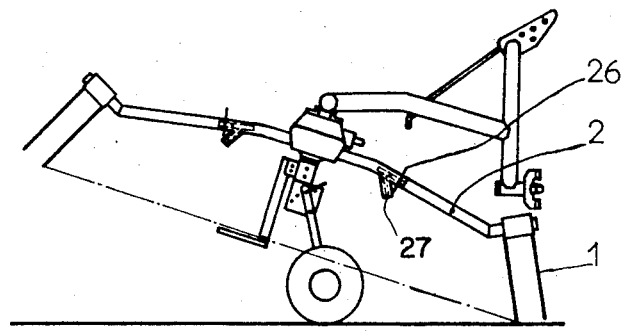
Figure 17:
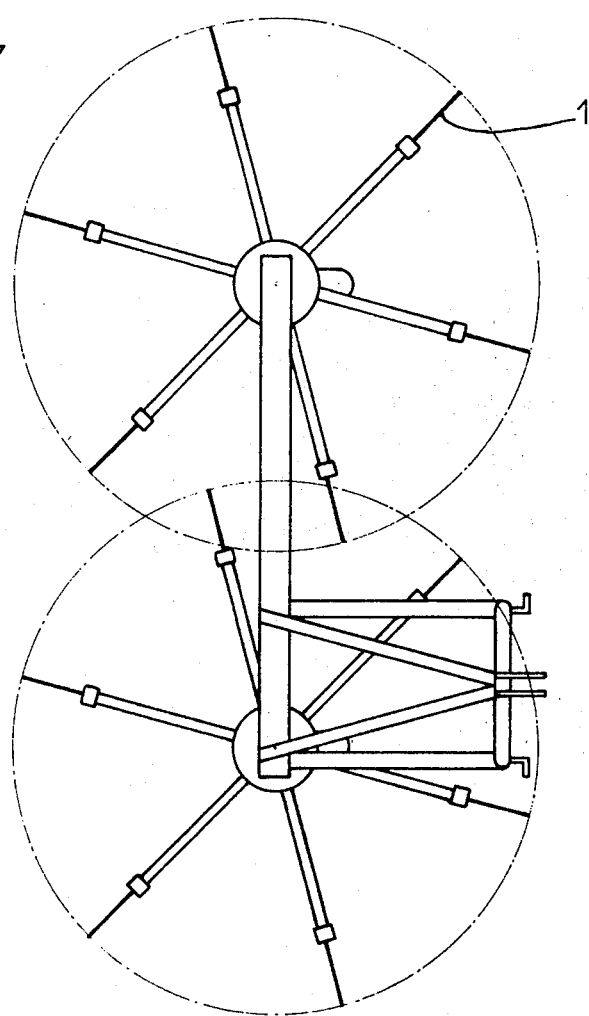
Figure 18:
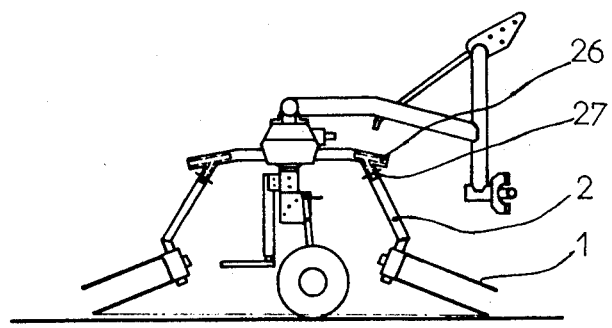
Figure 19:
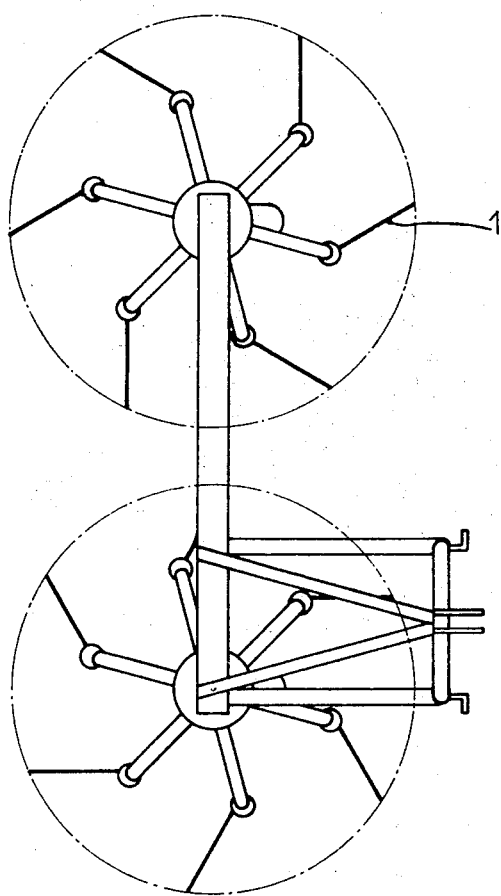
Figure 20:
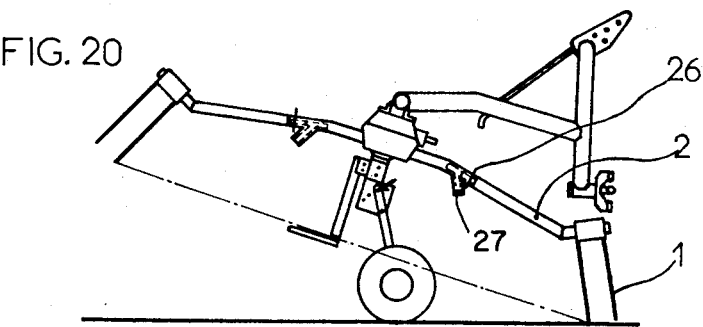
Figure 21:
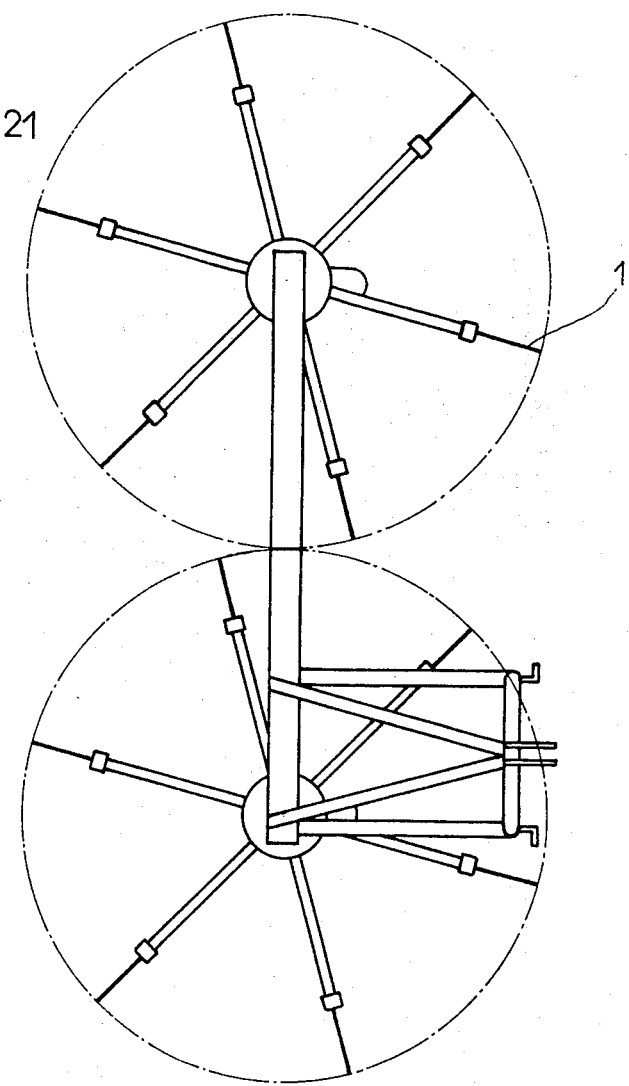
Figure 22:
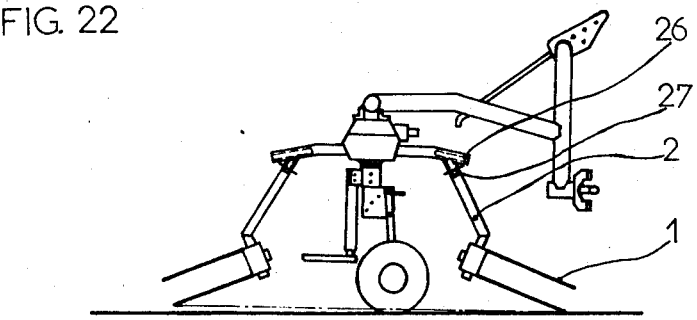
Figure 23:
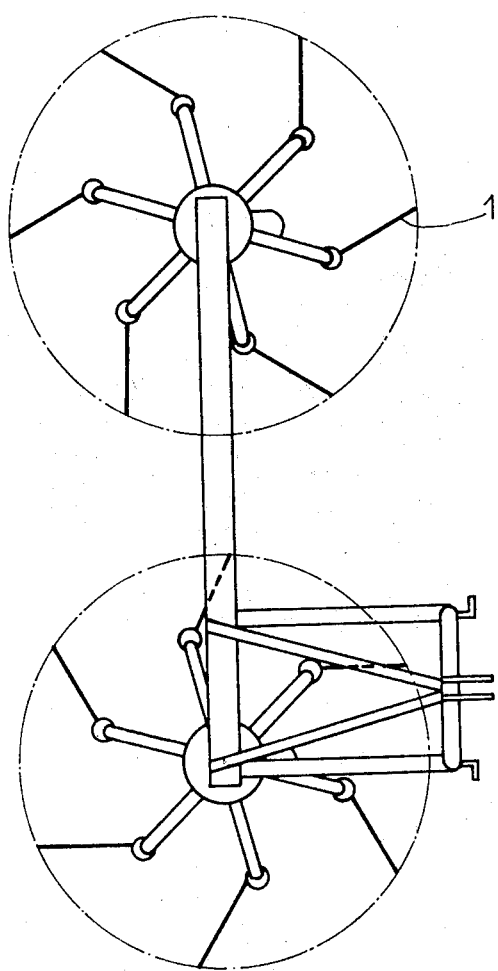

One advantageous solution according to the invention consists in placing the carrier wheels 25 as represented in FIG. 15 so that they bear simultaneously:

upon the plane F passing through the ends of the tools in the tedding position, at the front, and forming with the horizontal plane H passing through this same extremity an angle $\alpha$ corresponding to the angle of inclination of the axes of rotation of the spinners in the tedding position, and upon the substantially horizontal plane A passing through the extremities of the tools 1 in the windrowing position.

By virtue of this arrangement it is in fact possible to effect no regulation of the columns of the wheels during the transformation of the tedder into a windrower and vice versa, as accessiblity of these wheel columns is generally quite difficult.

In this case it will, for example, be possible to regulate the inclination of the spinners by means of an easily accessible peg 20 which permits locking the attachment device 21 of the machine in at least two distinct positions 22, 23 in relation to the plate 24 of the spinner-carrier chassis.

In the variants of embodiment as represented in FIGS. 16 to 23 the indicated positions of the tools 1 can be obtained by disconnection of the carrier arms 2 from a fixing point 26 fast with the rotating hub and by connection of these said arms at another fixing point 27 fast with the rotating hub, and vice versa.

Figure 24:
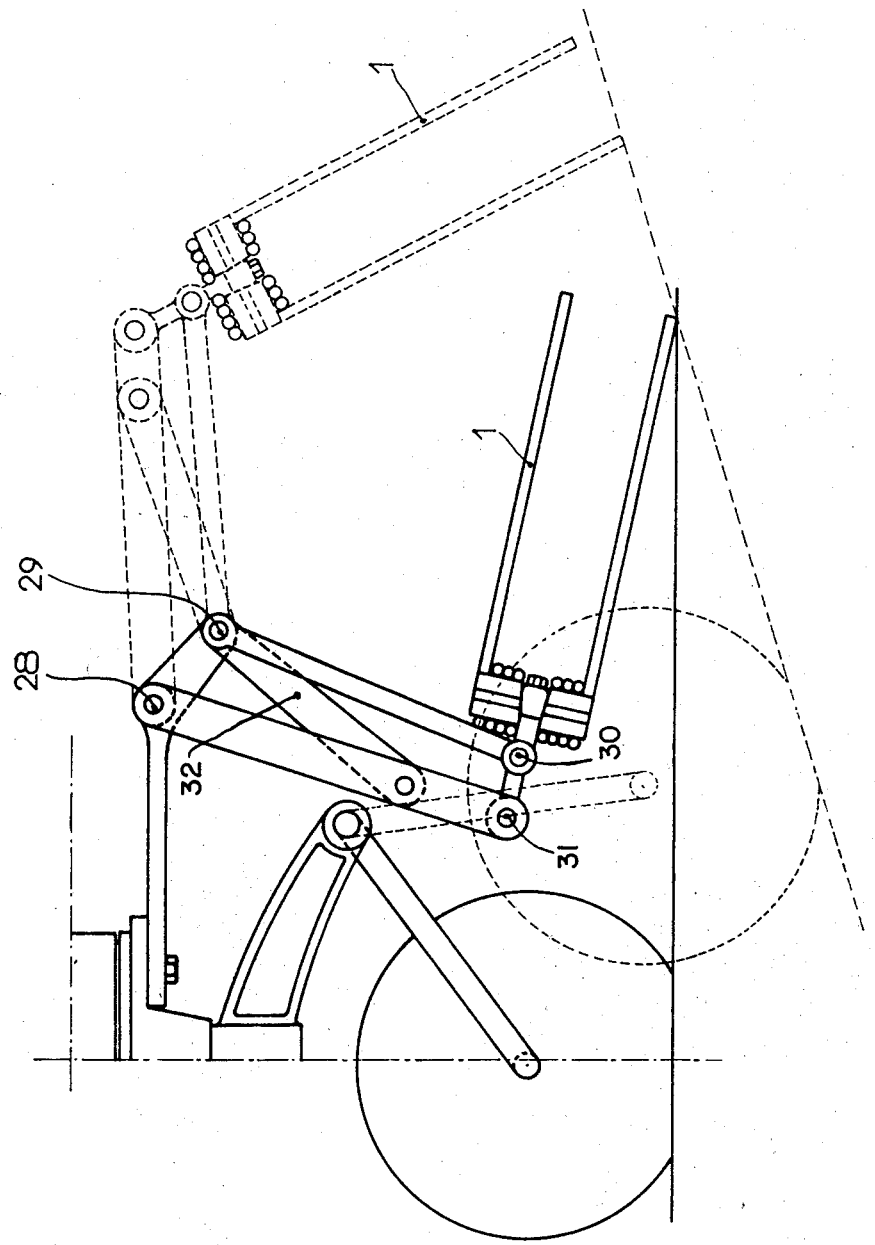

In the variant of the embodiment as represented in FIG. 24 each tool-carrier arm comprises four articulations 28, 29, 30, 31 for the purpose of the transposition of the tools 1 from the tedding position as represented in chain lines into the windrowing position as represented in continuous lines in FIG. 24.

A linkage cross-piece 32 permits of effecting locking in the desired positions.

In this embodiment the tools are thrust in an analogous manner for tedding and for windrowing.

Figure 25:
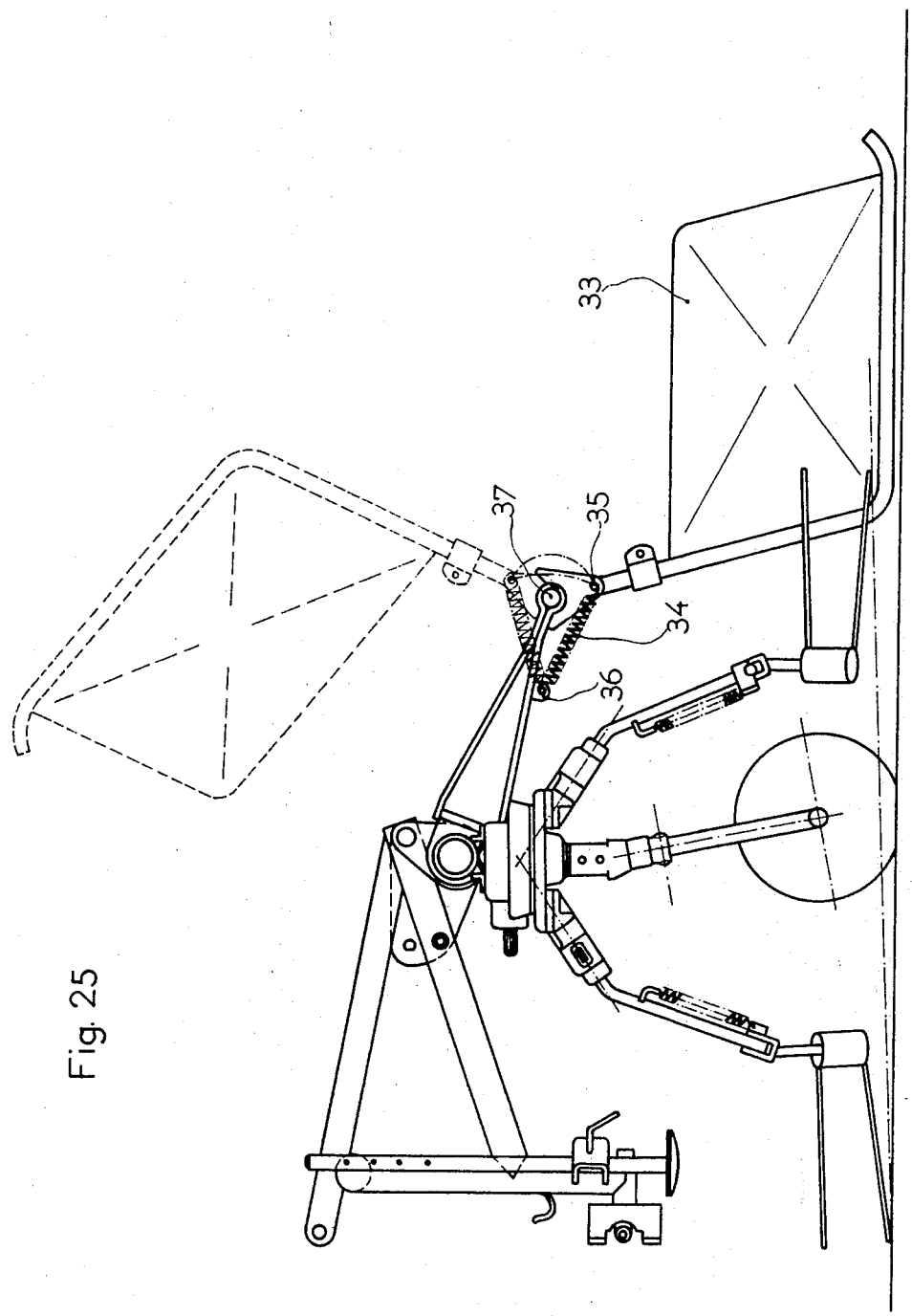

In FIG. 25 there may be seen a particular form of embodiment of fodder guide elements. This form of embodiment can be used with advantage on machines according to the invention as described above, but can equally be utilised on spinner-type machines in general.

The first particular feature of this form of embodiment consists simultaneously in articulating the guide elements 33 to the machine frame and in connecting these elements by means of an elastic connection 34 to this said frame.

The second particular feature resides in the position of the fixing points 35, 36 of the elastic connection in relation to the articulation point 37.

According to FIG. 25 the guide element 33 can be withdrawn upwards for the purpose of following ground level variations and for the purpose of clearing any obstacles. Thus they are not subject to deformation.

Furthermore the elastic connection 34 returns them into the utilisation position after every variaton of level, permitting of avoiding jumping of the guide elements and in other words of obtaining very clean windrowing.

Finally the same elastic connection 34 in combination with the articulation 37 permits of transposing the guide elements 33 into a raised transport position - as represented by way of example in chain lines in FIG. 25 - and of holding these guide elements in this latter position during transport. Means of regulation of the tension of the elastic connection can easily be provided and can prove useful in practice.

What is claimed is:

1. An agricultural hay-making machine for both tedding and windrowing, comprising at least two rotors, means mounting said rotors on said machine for rotation about axes displaced from the horizontal, a plurality of outwardly extending arms carried by each rotor, tines carried by the arms and having ends connected to the arms and free ends, and means mounted at least a portion of each of said arms for adjustive movement between a tedding position in which said tines extend downwardly from said connected ends to said free ends at a first angle to the horizontal when tedding, and a windrowing position in which said connected ends are more closely adjacent the ground when windrowing than in said tedding position and said tines are disposed at a second angle to the horizontal when windrowing which is substantially less than said first angle, said tines when windrowing being inclined to the rear from the direction of rotation of the rotor, the free ends of the tines when windrowing moving, by said adjustive movement, in a smaller circle than when tedding, each of said tines rotating substantially in a single plane while tedding and substantially in a single plane while windrowing.

2. A machine as claimed in claim 1, said arm mounting means mounting at least a portion of each of said arms for pivotal movement about an axis forming an angle between 20° and 40° with a plane perpendicular to the axis of rotation of the rotor and forming an angle between 8° and 20° with the plane that contains said axis of rotation of the rotor and that passes through the tines of the arm in question when said tines are in said tedding position.

3. A machine as claimed in claim 1, and means for releasably locking said at least a portion of each of said arms in each of said positions.

4. A machine as claimed in claim 1, and means for simultaneously moving all said arms of a said rotor between said positions.

5. Apparatus as claimed in claim 4, and means for simultaneously releasably securing all of said arms of a said rotor in one of said positions.

6. A machine as claimed in claim 1, said arm mounting means comprising at least two spaced articulations on each said arm.

7. A machine as claimed in claim 6, in which each said arm has four articulations for the transposition of said tines between said positions.

8. A machine according to claim 6, characterized in that the tines are moved into the working position under the action of centrifugal force when the rotors are driven in rotation.

* * * * *

UNITED STATES PATENT OFFICE
CERTIFICATE OF CORRECTION

PATENT NO. : 3,820,314
DATED : June 28, 1974
INVENTOR(S) : Walter Reber

It is certified that error appears in the above-identified patent and that said Letters Patent are hereby corrected as shown below:

Column 6, line 42, in the claim, change "mounted" to --mounting--.

Signed and sealed this 20th day of May 1975.

(SEAL)
Attest:

RUTH C. MASON
Attesting Officer

C. MARSHALL DANN
Commissioner of Patents
and Trademarks